United States Patent [19]

Zhiklenkox et al.

[11] 4,022,085
[45] May 10, 1977

[54] ROTOR MACHINE FOR CUTTING-OFF HOLLOW ARTICLES

[76] Inventors: Viktor Konstantinovich Zhiklenkox, ulitsa 25 sentyabrya, 54, kv. 27; Viktor Mikhailovich Ilin, ulitsa Rumyantseva, 15, kv. 14; July Fedorovich Martynenkov, ulitsa Oktyabrskoi revoljutsii, 7, kv. 92; Nikolai Kuzmich Petukhov, ulitsa V. Profinternovskaya, 32, all of Smolensk; Nikolai Vasilievich Volkov, ulitsa Fevralskaya, 11, kv. 11, Klimovsk, all of U.S.S.R.

[22] Filed: Dec. 8, 1975

[21] Appl. No.: 638,316

[52] U.S. Cl. .................................. 82/58; 82/57; 82/59; 82/82; 83/186
[51] Int. Cl.² ...................... B23B 3/04; B23B 5/14; B23D 21/00
[58] Field of Search ............ 82/57, 58, 59, 82, 101, 82/54; 83/186, 187, 190, 191, 666

[56] References Cited

UNITED STATES PATENTS

| | | | |
|---|---|---|---|
| 3,359,841 | 12/1967 | Cvacho et al. | 82/82 |
| 3,400,620 | 9/1968 | Armbruster et al. | 82/54 X |
| 3,646,840 | 3/1972 | Bozek | 82/101 X |
| 3,750,501 | 8/1973 | Miller | 82/59 |
| 3,864,995 | 2/1975 | Langewis | 82/58 X |
| 3,881,380 | 5/1975 | Paramonoff | 83/186 |
| 3,894,455 | 7/1975 | Stroobants | 83/666 X |
| 3,916,746 | 11/1975 | Stroobants | 83/666 X |

*Primary Examiner*—Francis S. Husar
*Assistant Examiner*—W. R. Briggs
*Attorney, Agent, or Firm*—Lackenbach, Lilling & Siegel

[57] ABSTRACT

A rotor machine designed to cup-off bellows' throats comprises a device for cutting-off the bellows' throats in the form of a rotor. Said device comprises a shaft, slides arranged parallel to the shaft axis and provided with mandrels for receiving the bellows, and tool units, each tool unit comprising a cutting tool in the form of a pair of cutters. One of said cutters, cylindrical in shape, is installed in the hollow holder coaxially with its inner surface which is eccentric relative to its outer surface. The other one of said cutters is made in the form of a ring consisting of two half-rings, the longitudinal axis of said ring being coaxial with the axis of the inner surface of the hollow holder at the moment of receiving the bellows to be cut-off. The half-rings are adapted for closing radially when clamping the bellows and for opening when releasing the bellows after its throat has been cut-off. The rotor machine according to the invention ensures high-quality cutting-off of bellows' throats and a more efficient use of labor.

8 Claims, 7 Drawing Figures

ROTOR MACHINE FOR CUTTING-OFF HOLLOW ARTICLES

The present invention relates to machining metals and, more particularly, it relates to rotor machines for cutting hollow articles.

The invention will be used to the best advantage for cutting corrugated thin-walled hollow articles, particularly bellows throats.

Known in the prior art are rotor machines for cutting cylindrical hollow articles.

Such rotor machines comprise a cutting device and a device for loading the parts, both devices being constituted by rotors kinematically linked with each other by a gear train.

The shaft of the cutting rotor mounts a drum which carries slides arranged parallel to the shaft axis, each slide being provided with a mandrel for receiving the work and intended to move said work along the shaft axis.

The rotor shaft mounts tool units whose number corresponds to that of the slides. Each tool unit consists of a body which accommodates a spindle carrying a cutting tool mounted parallel to the axis of the corresponding slide. The spindle is installed so that it may rotate around its axis and also so that it may feed the cutting tool mounted on it to the work and then withdraw said tool from said work upon completion of cutting. The cutting tool is withdrawn by turning it in a reverse direction relative to an axle rigidly secured to the rotor shaft, parallel with the latter.

The spindles of the tool units are linked kinematically by gears provided with an independent drive.

Each cutting tool is made in the form of a disc cutter of a known design (see, for example, Koshkin "All-round Automation of Production on the Basis of Rotor Lines", Mashinostroyeniye, 1965, USSR, Moscow).

The known device with the tool unit of this type is not adapted for cutting corrugated thin-walled hollow articles such as, say, a bellows.

In view of the extensive development of systems for controlling various production processes, transport facilities, industrial and utility installations, there has been a growing demand for hollow corrugated articles, e.g. bellows. During the manufacture of a bellows, its forming must be followed by cutting off its throat to a certain length.

At present, the bellows' throats are cut off on machines wherein the cutting tool is constituted by a milling or disc cutter. Such machines are not very efficient and call for a high skill on the part of the operator. These machines cannot ensure a stable quality of cutting-off of the bellows' throats due to rolling-in of the throat edges. Therefore, the bellows' throats cut-off on these machines have to be additionally flared.

The multiple-series and large-scale manufacture of bellows calls for a large number of such machines and, consequently, for more operators and production areas.

The object of the present invention lies in providing a rotor machine for cutting-off hollow articles wherein the cutting device would be so designed as to ensure a stable quality of cutting off the bellows' throats combined with a more efficient use of labour.

This object is accomplished by providing a rotor machine for cutting hollow articles, wherein the cutting device, which is kinematically linked with the device for loading the parts, is made in the form of a rotor and carries slides arranged parallel to the rotor shaft axis, each slide being provided with a mandrel for receiving the work and intended for moving said work along the shaft axis, and tool units, each tool unit having a cutting tool installed parallel to the axis of the corresponding slide, rotatably positioned and being fed towards the hollow article in the direction of the rotor shaft axis, and wherein, according to the invention, the cutting tool of each tool unit is made of a pair of cutters arranged coaxially at the moment of receiving the work, one of the cutters being cylindrical and having a cutting edge on one face and being installed in a hollow holder, said holder being mounted in the tool unit, coaxially with the inner surface of said holder which is eccentric relative to its outer surface, said holder being adapted for reversing turning relative to the axis of the outer surface, the other cutter is made in the form of a ring with a cutting edge on the face directed to the face of one of the pair of cutters, said ring being installed so that its longitudinal axis is coaxial with the axis of the inner surface of the hollow holder at the moment of receiving the work, said ring consisting of two half-rings adapted for closing radially with relation to their axis when clamping the work and for opening when the work has to be released after cutting.

The rotor machine for cutting hollow articles according to the present invention ensures high quality of cutting the bellows' throats combined with a high efficiency of labour. Besides, such a layout of the rotor machine improves the stability of the cutters.

It is practicable that the hollow holder of each tool unit with a cylindrical cutter should be mounted on a carriage and the half-rings of the other cutter should be mounted on carriages of their own; the carriages should be installed in guides made on opposite walls of a housing rigidly connected with the rotor shaft and should be set perpendicularly to the axis of the housing shaft.

This design of the tool unit is simple while the suggested arrangement of the cutter carriages ensures high quality of cutting the bellows' throats.

It is highly practicable that the carriages mounted with the half-rings of the other cutter of each tool unit should be moved radially by a system of levers connected with the carriages and by an additional slide set parallel to the rotor shaft and linked kinematically with it and connected with said system of levers.

Such an arrangement will produce a compact and sufficiently simple design of the rotor machine which is easy to service and operate.

It is recommended that the carriages on which the cutter half-rings are mounted should comprise flexible elements installed at the side of these half-rings, underneath, said elements being intended for clamping the work on its side surface.

This rules out any crushing of the bellows corrugations while cutting-off its throat.

It is practicable that the hollow holder carrying the cylindrical cutter of each tool unit should be reversed relative to the axis of its outer surface by means of a gear rigidly secured to the hollow holder and by a sector gear installed on the carriage of this holder and kinematically linked with the rotor shaft and interacting with said gear.

This guarantees reliable performance of the cutters for cutting-off hollow articles and a simple design of for a tool unit.

It is recommended that the rotor machine should have devices for clamping the parts on the slide mandrels, each device comprising a slide kinematically connected with the rotor shaft and installed parallel to it at the side of the tool unit opposite to the slides carrying mandrels, and a rod connected with said slide and accommodated in the hollow holder coaxially with its inner surface.

This clamping device ensures reliable fixing of the work on the slide mandrels in order to introduce the work accurately into the tool unit and slip it on the cylindrical cutter.

It is practicable that the rod of each work-clamping device should have longitudinal slots on the outer surface, said slots accommodating plate springs for holding the cut-off part of the work.

Thus, it becomes possible to withdraw the cut-off throat from the bellows to allow accumulation of bellows in a hopper located at a certain distance from the throat hopper.

The rotor machine for cutting-off hollow articles according to the invention is adapted for automatic cutting-off bellows' throats with a high and stable quality. Besides, the rotor machine according to the invention promotes a considerably more efficient use of labour.

After the bellows' throats have been cut off on such a rotor machine, there is no need for such a difficult operation as flaring which is required while cutting-off throats on the known machines.

The use of the rotor machine according to the present invention instead of the known low-efficiency machines results is a considerable saving in production areas.

Other details and advantages of the invention will become apparent from the description of its embodiment that follows and from the appended drawings in which.

Figure 1:
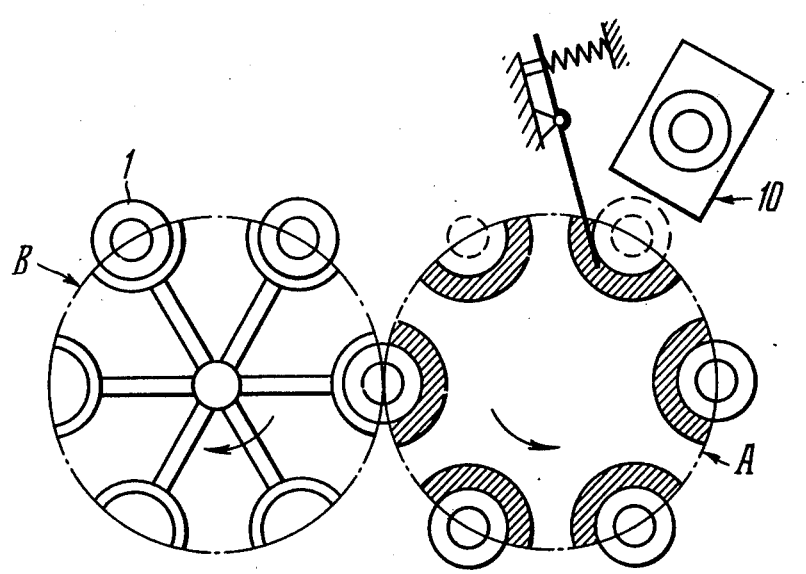
FIG. 1 is a schematic plan view of the rotor machine according to the invention.

The rotor machine for cutting-off bellows' throats according to the invention comprises a device A (FIG. 1) for cutting-off the throats of bellows 1, said device being kinematically linked with a device B for loading the bellows.

Figures 2, 5:
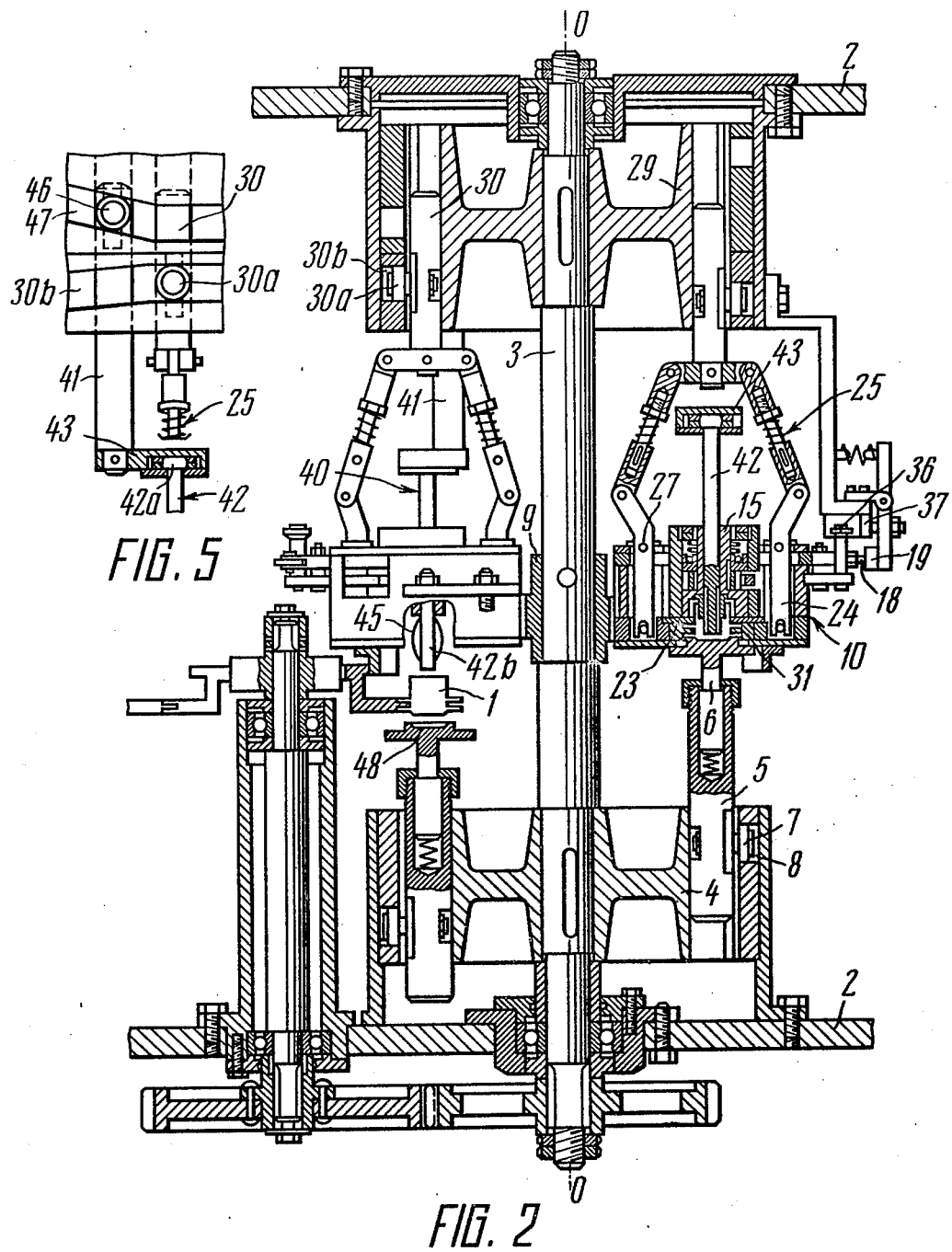
FIG. 2 is a longitudinal section of the rotor machine according to the invention.
FIG. 5 is an enlarged longitudinal view partially in section of the work-clamping device.

The device A consists of a rotor mounted on a bed 2 (FIG. 2) and provided with a shaft 3 whose ends are installed on the bed 2. The shaft 3 mounts a drum 4 accommodating slides 5 which are arranged parallel to the axis of the shaft 3, each slide carrying a mandrel 6 for receiving the bellows 1 and being intended to move the bellows 1 parallel to the axis 0—0 of the shaft 3.

Secured to each slide 5 is a roller 7 installed so that its axis is perpendicular to the longitudinal axis of the slide 5. This roller is installed in a shaped slot of a master form 8 rigidly secured on the bed 2.

Such an arrangement ensures the required mode of movement of each slide with the mandrel 6 and, accordingly, of the bellows 1 along the axis 0—0 of the shaft 3. Rigidly secured on the shaft 3 is a carrier or housing 9 on which are mounted tool units 10 (FIGS. 1, 2), one tool unit for each slide 5.

Each tool unit 10 (FIGS. 2, 3, 4) consists of a body 11 (FIGS. 3, 4) whose opposite walls, which are arranged perpendicularly to the axis 0—0 of the rotor shaft 3, are provided with guides 12 and 13 (FIG. 3), which likewise are set perpendicularly to the axis of the rotor shaft 3. Located in the guide 12 is a carriage 14 (FIGS. 3, 4) with a hollow holder 15 whose inner surface is eccentric relative to its outer surface. Rigidly secured to the hollow holder 15 is a cylindrical cutter 16 (FIG. 3) with a cutting edge on one of its faces lying in the same plane as the face of the hollow holder. The cutter 16 is installed eccentrically to the axis of the inner surface of the hollow holder and coaxially with the axis of its inner surface.

On the carriage 14 (FIGS. 3, 4) an axle 17 is installed carrying a roller 18 (FIGS. 2, 3, 4) which interacts with a master form 19 (FIG. 2) connected with the bed 2.

This arrangement makes it possible to move the carriage 14 towards the axis 0—0 of the shaft 3 to the stop 20a (FIG. 4) installed in the tool unit body 11 and, consequently, to feed the cylindrical cutter 16 towards the bellows 1.

A spring-loaded pusher 21 installed in the body 11 is intended to move the carriage 14 to the initial position until it comes against the stop 20b which is rigidly installed in the body 11.

The guide 13 (FIG. 3) accommodates carriages 22, each of which is mounted with a cutter 23, which has a cutting edge on the face directed to said face of the cylindrical cutter, which is made in the form of a ring consisting of half-rings 23a and 23b.

The cutter 23 is installed so that its longitudinal axis C—C is coaxial with the axis of the inner surface of the hollow holder at the moment when the bellows 1 is received into the tool unit.

The half-rings 23a and 23b of the cutter 23 can close radially relative to their axis C—C for clamping the bellows 1 and can open when the bellows must be released after cutting-off its throat. For this purpose each carriage 22 mounted with the half-ring of the cutter 23 is connected with the lever 24 (FIGS. 2, 3) of the lever system 25 (FIG. 2) by means of an axle 26 (FIG. 3) rigidly secured in the carriage 22. The lever 24 is installed so that it may turn around its axle 27 (FIGS. 2, 3), which is rigidly fastened to the cover 28a of the tool unit body 11.

The rotor shaft 3 mounts an additional drum 29 at the side of the tool unit 10 opposite to the location of the drum 4 with the slides 5, said drum accommodating additional slides 30, each of which is connected, with a corresponding system 25 of levers.

Secured to each additional slide 30 which is parallel to the rotor shaft 3 is a roller 30a (FIGS. 2, 5) whose axis is perpendicular to the longitudinal axis of the slide. This roller is accommodated in a shaped slot of the master form 30b rigidly fastened to the bed 2.

This ensures the required mode of movement of the additional slide and, consequently, via the system 25 of levers, of the carriages 22 which are mounted with the half-rings 23a, 23b of the cutter 23.

For clamping the workpiece 1 on its side surfaces, the carriages 22 mounted with the half-rings 23a, 23b of the cutter 23 are provided with flexible elements 31 (FIGS. 2, 3) rigidly secured at the side of the cutter location. This is necessary in order to prevent crushing of the corrugations while cutting-off the bellows' throats.

The hollow holder 15 is adapted for reversably turning around the axis of its outer surface by means of a spur gear 32 (FIG. 3) rigidly secured on the hollow holder and a sector gear 33 (FIGS. 3, 4) interacting with said gear 32. The rotation axle of the sector gear is rigidly secured on the carriage 14 parallel to the axis 0—0 of the rotor shaft 3. The sector gear 33 has an axle 35 (FIGS. 2, 3, 4), arranged likewise parallel to the axis 0—0 of the rotor shaft 3 and carrying a roller 36 on one of its ends. The master form 37 (FIG. 2) interacting with the roller 36 is secured rigidly to the rotor bed 2.

This provides for the required reverse turning of the sector gear and, consequently, of the cylindrical cutter for cutting-off the bellows' throat.

Mounted rigidly on the tool unit body 11 (FIG. 4) is a stop 38 intended for accurate positioning of the sector gear 33 in the initial position by interacting with a projection 39.

Figure 3:
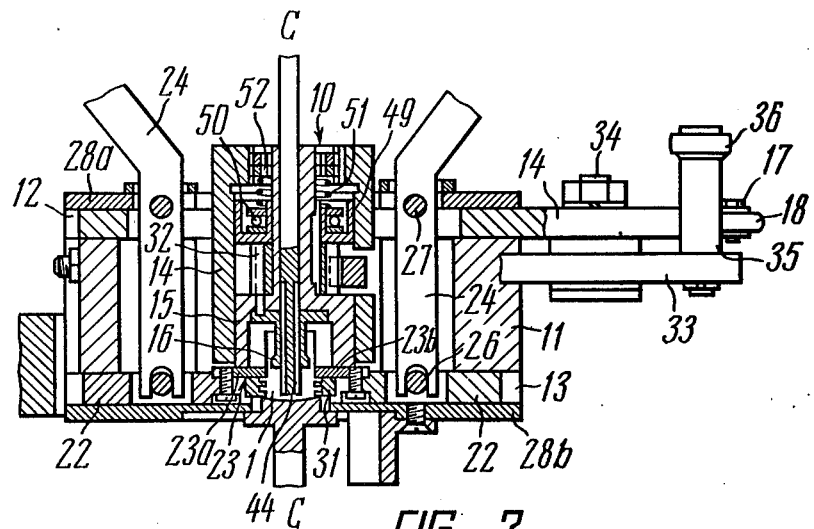
FIG. 3 is an enlarged section of the tool unit shown in FIG. 2.

For clamping the workpieces, particularly bellows, the mandrels 6 (FIG. 2) of the slides 5 are provided with devices 40, each device comprising a slide 41 installed in an additional drum 29 parallel to the rotor shaft 3, and a rod 42 connected with said slide. The slide 41 is connected with the rod 42 by a strap 43 (FIG. 2, 5) rigidly secured to said slide; said strap serves for articulating the rod 42 by one of its ends 42a (FIG. 3). The other end 42b (FIG. 2) of the rod passing through the hollow holder 15 and the cylindrical cutter 16 is intended to fix the bellows 1 on the mandrel 6.

The outer surface of the end 42b of the rod passing through the hollow holder 15 is provided with longitudinal slots 44 (FIG. 3) which accommodate plate springs 45 (FIG. 2) for holding the cut-off throat of the bellows 1.

Secured to each slide 41 (FIG. 5) is a roller 46 installed so that its axis is perpendicular to the longitudinal axis of the slide. This roller is located in a shaped slot of the master form 47 rigidly secured on the bed 2.

In this way it becomes possible to ensure the required mode of movement of the slide 41 and, consequently, the method of fixing the bellows 1 on the mandrel 6.

The end 48 of the mandrel 6 (FIG. 2) has a shaped surface identical with the outline of the bottom of the bellows 1.

Apart from the above-mentioned basic parts, the tool unit 10 (FIG. 3) in the given embodiment of the present invention comprises an insert 49 installed on the hollow holder 15 and accommodating a thrust ball bearing 50. One end of the spring 51 bears against the race of the bearing 50 while its other end is loaded by a nut 52. Such a layout ensures control of the pressure exerted by the hollow holder 15 on the circular cutter 23 which becomes necessary when the cutting edges of the cutters get blunted or the cutters have to be replaced.

The bellows throats are cut-off on the rotor machine according to the present invention as follows. The device B feeds the bellows 1 into the device A in the form of a rotor for cutting the bellows throat. The bellows takes a position between the slide 5 carrying the mandrel 6 and the tool unit 10, coaxially with the cylindrical cutter 16.

Figure 6:
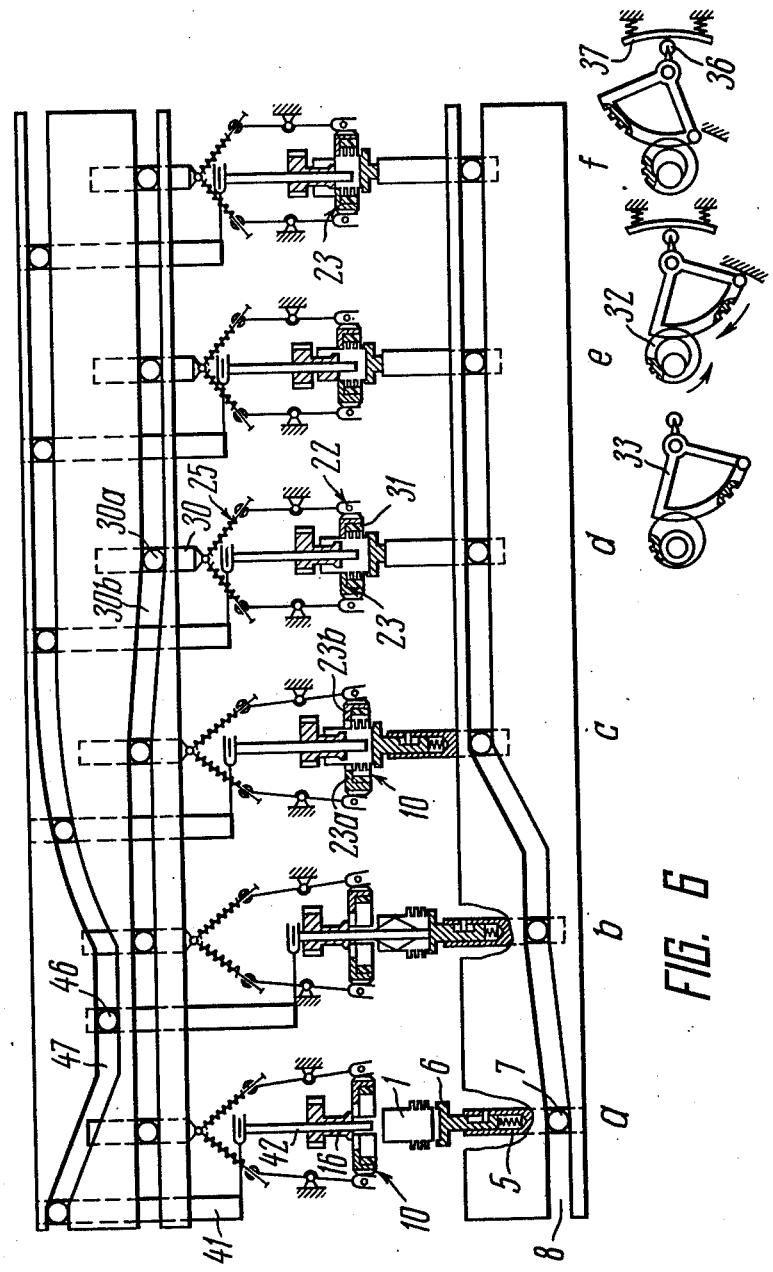
FIGS. 6, 7 illustrate typical cyclograms of the rotor machine.

At this stage all the elements of the rotor machine occupy position a (FIG. 6).

As the rotor revolves, each slide 5 with the mandrel 6 moves towards the tool unit 10 according to a preset law realized with the aid of the roller 7 secured to said slide 5 and rolling over the shaped slot of the master form 8. Simultaneously, each slide 41 connected with a rod 42 by a strap 43 moves towards the slide 5 according to a preset law realized with the aid of a roller 46 secured to said slide 41 and rolling over the shape slot of the master form 47.

The bottom of the bellows rests on the approaching mandrel 6 of the slide 5 while the throat of the bellows is slipped on the rod 42 which presses the bellows bottom against the mandrel 6 of the slide 5 with a force which is sufficient for its reliable fixing. At this stage all the elements of the rotor machine occupy position b.

During further rotation of the rotor, the slide 5 with the mandrel 6 moves towards the tool unit 10 whereas the slide 41 connected with the rod 42 moves simultaneously with the slide 5 away from the tool unit 10 so that the throat of the bellows 1 comes over the cylindrical cutter 16 while the first corrugation located near the bellows throat rests on the face surface of the half-rings 23a and 23b of the circular cutter 23. The elements of the rotor machine occupy position c.

Then each additional slide 30 connected with the system 25 of levers which, in turn, is coupled to the carriages mounted with the half-rings of the cutter 23 moves towards the tool unit 10 according to a preset law realized with the aid of a roller 30a secured to said additional slide and rolling over the shaped slot of the master form 30b. As a result, the bellows is clamped by the flexible elements 31 and the half-rings of the cutter 23 grasp the bellows throat.

As the rotor revolves further, the rod 42, which is connected with the slide 41 secured 41 secured to which is the roller 46 rolling over the slot of the master form 47, moves away from the tool unit 10, thereby releasing the bellows bottom. All the elements of the rotor machine are in position d.

As the rotor continues revolving, the carriage 14 mounted with the hollow holder 15 carrying the cylindrical cutter 16 moves towards the shaft according to the preset law realized with the aid of roller 18 which is secured to said carriage and rolls over the master form 19 as far as the stop 20a. The bellows throat is cut through and all the elements of the rotor machine occupy position e.

Figure 4:
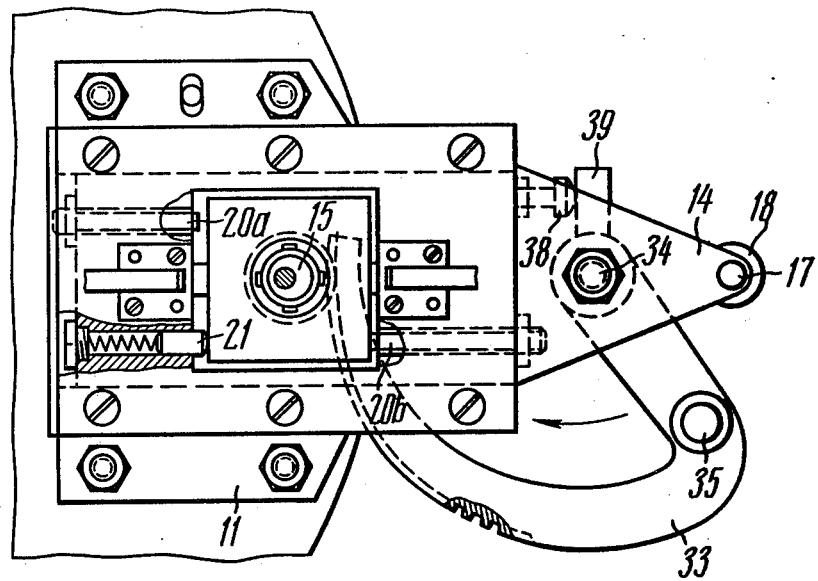
FIG. 4 is an enlarged plan view of the tool unit.

Then the sector gear 33, which is connected with the spur gear 32, which is rigidly mounted on the hollow holder 15 carrying the cylindrical cutter 16, turns counterclockwise around the axle 34 shown in FIG. 4 according to the preset law realized with the aid of the roller 36 secured to said sector gear and rolling over the master form 37, thus cutting-off the bellows throat along the entire perimeter. At this stage all the elements of the rotor machine are in position f.

Figure 7:
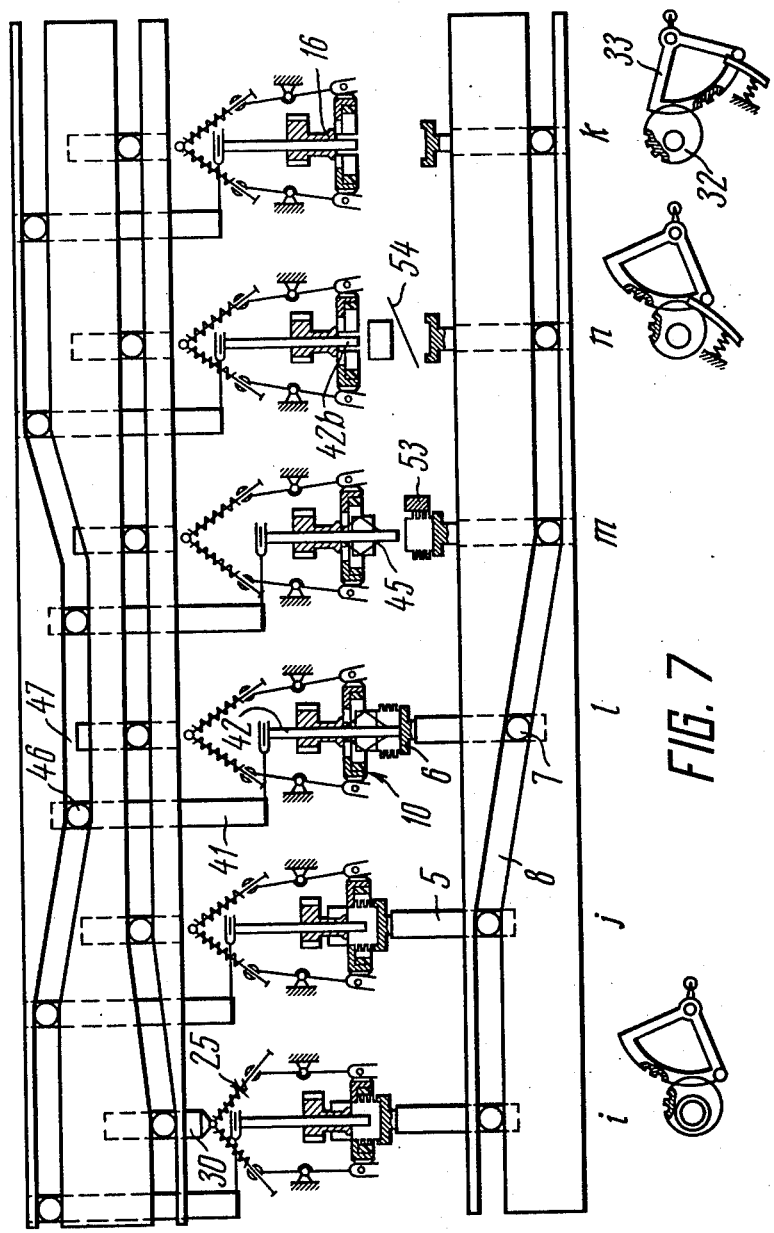

Then in the course of further revolving of the rotor, the carriage 14 mounted with the hollow holder 15 is moved by the pusher 21 to the initial position as far as the stop 20b. The elements of the rotor machine are in position i (FIG. 7).

When the additional slide 30 connected with the system 25 of levers moves away from the tool unit 10, according to the preset law realized with the aid of the roller 30a and master form 30b, the carriages 22 move apart and take the initial position thus releasing the bellows. The elements of the rotor machine occupy position j.

Then each slide 5 mounting the mandrel 6 moves away from the corresponding tool unit 10 according to the preset law realized with the aid of the roller 7 and master form 8. The slide 41 connected with the rod 42 moves simultaneously with the slide 5 according to the preset law realized with the aid of the roller 46 which rolls over the shaped slot of the master form 47 to the tool unit 10 at a speed equal to that of the slide 5. As a result, the cut-off throat and the bellows are withdrawn from the tool unit 10. The elements of the rotor machine occupy position *l*.

The rotor continuing to rotate, the slide 5 goes on moving away from the tool unit 10 according to the preset law realized with the aid of the roller 7 and master form 8 to the initial position severing the bellows from the cut-off throat which latter is held by the plate springs 45. Coming to the stop 53 (FIG. 7) the bellows falls into the chute 54 for further movement into the bellows hopper. All the elements of the rotor machine occupy position *m*.

Then the slide 41 connected with the rod 42 moves away from the tool unit 10 according to the preset law realized with the aid of the roller 46 which rolls over the master form 47 so that the rod 42 enters the hole of the hollow holder 15. The plate springs 45 located on the end 42*b* of the rod are pressed to the slots 44 of the rod 2 and the cut-off throat of the bellows falls on the chute 54 for further movement into the throat hopper. All machine elements are in position *n*.

As the rotor continues to revolve, the sector gear 33 and the hollow holder 15 with the cylindrical cutter 16 kinematically linked with said sector gear return to the initial position. All the elements of the rotor machine occupy position *k*, ready for the next cycle.

An experimental model of the rotor machine according to the present invention has passed the tests which proved the possibility of cutting off the bellows throats with a stable high quality combined with a high labour efficiency so that the throats of 100 bellows of 23 mm diameter are cut off in a minute.

This rotor machine occupies a small production area and dispenses completely with manual work.

The bellows whose throats are cut-off on such a rotor machine are characterized by a high quality, the percentage of waste constituting a negligible portion of the entire quantity of handled bellows.

The rotor machine according to the invention can be used in an automatic bellows-making line.

We claim:

1. A rotor machine for cutting-off hollow articles comprising: a bed; a device for loading parts installed on said bed; a device for cutting-off parts mounted on said bed and being kinematically linked with said device for loading parts, said device for cutting-off parts made in the form of a rotor comprising a shaft installed in said bed and tool units mounted on said shaft, each of said tool units consisting of a hollow holder arranged parallel to the axis of said shaft and having an inner surface which is eccentric relative to its outer surface and means for reversably turning said hollow holder relative to the axis of the outer surface and a cutting tool in the form of a pair of cutters arranged parallel to the axis of said shaft and having means to coaxially align the cutters with each other at the moment in time when the part is introduced in the device for cutting-off parts, one cutter of said pair of cutters being cylindrical in shape with a cutting edge on one of its faces, said cutting edge lying in the same plane as a face of the hollow holder, said cutter being installed in said hollow holder coaxially with its inner surface with a provision for moving said cutter towards the part in a direction parallel to the axis of said shaft by means of a carriage upon which the hollow holder is located, an axle installed upon said carriage, a roller carried on said axle and a master form, connected to said bed, which interacts with said rollers, the other one of said pair of cutters is in the form of a ring and is provided with a cutting edge on the face directed to the face of the first cutter of said pair of cutters, said other one of said pair of cutters having means to provide that its longitudinal axis is coaxial with the axis of the inner surface of the hollow holder at the moment in time when the part is introduced into the device for cutting-off parts, said other one of said pair of cutters being formed by two half-rings and constructed to close radially relative to their axis when clamping the part and for opening when releasing the cut-off part; a means for closing and opening said half-rings radially relative to their axis; a drum installed on said rotor shaft at one side of said tool units; slides mounted in said drum parallel to the axis of said shaft to move the part in a direction parallel to the axis of said shaft; mandrels mounted on each of said slides for receiving the part; a means for reversable turning of each of said hollow holders relative to the axis of its outer surface, said means being mounted in each of said tool units.

2. A rotor machine according to claim 1 wherein said hollow holder of each of said tool units with said one cylindrical cutter of said pair of cutters secured thereto is located on said carriage, whereas said half-rings of said other cutter of said pair of cutters are located on other carriages; all of said carriages are accommodated in guides provided on opposite walls of the housing which is connected rigidly with said shaft, said guides being perpendicular to the axis of said shaft.

3. A rotor machine according to claim 2 wherein radial movement of said carriages mounting said half-rings of the other cutter of said pair of cutters of each of said tool units is effected by a system of levers connected with said carriages and by an additional slide installed parallel to said rotor shaft and kinematically linked to said shaft and said additional slide being connected with said system of levers.

4. A rotor machine according to claim 2 wherein said carriages mounting said half-rings of the other cutter of said pair of cutters are provided with flexible elements to clamp the work on its side surface, said flexible elements being located at the side of said half-rings.

5. A rotor machine according to claim 1 which has a devices for fixing the parts on said mandrels of said slides, each device comprising an additional slide connected kinematically with said rotor shaft and set parallel to said rotor shaft at that side of said tool units which is opposite to the location of said slides carrying said mandrel, and a rod connected with said additional slide and arranged in said hollow holder coaxially with its inner surface.

6. A rotor machine according to claim 5 wherein said rod of each of said devices for fixing the part has longitudinal slots on its outer surface, said slots accommodating plate springs for holding the cut-off portion of the part.

7. A rotor machine according to claim 1, wherein said means for reversably turning consists of a spur gear rigidly secured to said hollow holder and a sector gear interacting with said spur gear.

8. A rotor machine according to claim 1 wherein the reversable turning of said hollow holder mounting said one cutter of said pair of cutters, the one which is cylindrical in shape, of each of said tool units relative to the axis of the outer surface of said hollow holder is effected with the aid of said spur gear rigidly secured on said holder and said sector gear interacting with said spur gear, linked kinematically with said rotor shaft and installed on said carriage mounting said hollow holder.

* * * * *

UNITED STATES PATENT OFFICE
CERTIFICATE OF CORRECTION

PATENT NO. : 4,022,085
DATED : May 10, 1977
INVENTOR(S) : Viktor Konstantinovich Zhiklenkov, et al It is certified that error appears in the above-identified patent and that said Letters Patent are hereby corrected as shown below:

Item [76], Change "Zhiklenkox et al." to --Zhiklenkov et al

Item [76], Change "Viktor Konstantinovich Zhiklenkox" to --Viktor Konstantinovich Zhiklenkov--.

Signed and Sealed this

Thirteenth Day of September 197

[SEAL]

Attest:

RUTH C. MASON
Attesting Officer

LUTRELLE F. PARKER
Acting Commissioner of Patents and Trademark